United States Patent [19]
Schmittle

[11] Patent Number: 5,863,013
[45] Date of Patent: Jan. 26, 1999

[54] STOL/VTOL FREE WING AIRCRAFT WITH IMPROVED SHOCK DAMPENING AND ABSORBING MEANS

[75] Inventor: Hugh Schmittle, Westminster, Md.

[73] Assignee: Freewing Aerial Robotics Corporation, College Park, Md.

[21] Appl. No.: 467,107

[22] Filed: Jun. 6, 1995

Related U.S. Application Data

[63] Continuation-in-part of Ser. No. 332,321, Oct. 31, 1994, which is a continuation of Ser. No. 7,130, Jan. 22, 1993, Pat. No. 5,395,073, which is a continuation-in-part of Ser. No. 850,913, Mar. 13, 1992, Pat. No. 5,340,057, which is a continuation-in-part of Ser. No. 795,329, Nov. 21, 1991, Pat. No. 5,280,863.

[51] Int. Cl.$^6$ ........................................................ B64C 3/38
[52] U.S. Cl. ............................... 244/48; 244/7 R; 244/38; 244/39; 244/104 LS
[58] Field of Search .............................. 244/48, 7 R, 7 A, 244/7 B, 7 C, 39, 104 LS, 104 R, 103 R, 100 R

[56] References Cited

U.S. PATENT DOCUMENTS

| | | |
|---|---|---|
| 18,181 | 9/1857 | Stelzer . |
| 1,016,929 | 2/1912 | Black . |
| 1,083,464 | 1/1914 | Roche . |
| 1,132,503 | 3/1915 | Wittkowski . |
| 1,240,371 | 9/1917 | Robinson .......................... 244/104 LS |
| 1,472,103 | 10/1923 | Vandevelde . |
| 1,771,257 | 7/1930 | Ingram . |
| 1,772,586 | 8/1930 | Wilford . |
| 1,845,307 | 1/1932 | Maxwell . |
| 1,861,336 | 5/1932 | Cox . |
| 1,906,005 | 4/1933 | Hall . |
| 2,058,678 | 10/1936 | Fry . |
| 2,063,030 | 12/1936 | Crouch . |
| 2,066,649 | 1/1937 | Sabins . |
| 2,082,674 | 6/1937 | Young . |
| 2,118,987 | 5/1938 | Smith . |
| 2,347,230 | 4/1944 | Zuck . |
| 2,362,224 | 11/1944 | Roseland . |
| 2,416,958 | 3/1947 | Sears . |
| 2,438,309 | 3/1948 | Zimmerman . |
| 2,481,379 | 9/1949 | Zimmerman . |
| 2,536,298 | 8/1951 | Winslow . |
| 2,541,922 | 2/1951 | Hosford . |
| 2,580,312 | 12/1951 | Moore . |
| 2,584,667 | 2/1952 | Bockrath . |
| 2,623,712 | 12/1952 | Spratt . |
| 2,678,783 | 5/1954 | Myers ..................................... 244/7 B |
| 2,708,081 | 5/1955 | Dobson . |
| 2,959,373 | 11/1960 | Zuck . |
| 2,960,285 | 11/1960 | Lopez . |

(List continued on next page.)

FOREIGN PATENT DOCUMENTS

| | | |
|---|---|---|
| 790597 | 11/1935 | France . |
| 997796 | 1/1952 | France . |
| 109821 | 6/1923 | Sweden ............................. 244/104 R |
| 7209 | 12/1909 | United Kingdom . |
| 123174 | 2/1919 | United Kingdom ............... 244/100 R |
| 375530 | 6/1932 | United Kingdom . |
| 732657 | 6/1955 | United Kingdom . |

*Primary Examiner*—Robert J. Oberleitner
*Assistant Examiner*—Tien Dinh
*Attorney, Agent, or Firm*—Lowe Hauptman Gopstein Gilman & Berner

[57] ABSTRACT

An improved VTOL/STOL free wing aircraft providing damping and absorption of shock landing loads upon landing. A pair of resilient struts is provided, projecting forwardly from the trailing edge of either side of the fuselage when the fuselage is tilted. Preferably, the aircraft includes a pair of articulated tail booms, the strut being a portion of the tail boom extending forward from the pivot axis of the tail boom. Landing wheels are disposed on the strut in tandem spaced relationship. The resiliency of the strut causes the strut to act as a leaf spring and thus dampen shock landing loads. Operatively secured to the bottom surface of the fixed wing portions and the forward portion of the landing gear struts is a pair of dashpots for absorbing the shock landing loads.

1 Claim, 3 Drawing Sheets

U.S. PATENT DOCUMENTS

| | | |
|---|---|---|
| 3,006,582 | 10/1961 | Geiger . |
| 3,035,789 | 5/1962 | Young . |
| 3,166,271 | 1/1965 | Zuck . |
| 3,236,182 | 2/1966 | Dahm . |
| 3,415,469 | 12/1968 | Spratt . |
| 3,430,894 | 3/1969 | Strand et al. . |
| 3,477,664 | 11/1969 | Jones . |
| 3,561,702 | 2/1971 | Jones . |
| 3,587,770 | 6/1971 | Flower . |
| 3,730,459 | 5/1973 | Zuck . |
| 3,795,373 | 3/1974 | Gerard . |
| 4,124,180 | 11/1978 | Wolowicz . |
| 4,145,132 | 3/1979 | Shirk . |
| 4,199,119 | 4/1980 | Masclet .............................. 244/104 FP |
| 4,372,506 | 2/1983 | Cronk et al. ........................ 244/100 R |
| 4,568,043 | 2/1986 | Schmittle . |
| 4,596,368 | 6/1986 | Schmittle . |
| 4,730,795 | 3/1988 | David . |
| 4,770,372 | 9/1988 | Ralph ................................ 244/104 FP |
| 4,928,907 | 5/1990 | Zuck . |
| 4,967,984 | 11/1990 | Allen . |
| 5,086,993 | 2/1992 | Wainfan . |
| 5,098,034 | 3/1992 | Lendriet . |
| 5,280,863 | 1/1994 | Schmittle . |
| 5,340,057 | 8/1994 | Schmittle . |
| 5,395,073 | 3/1995 | Rutan et al. . |

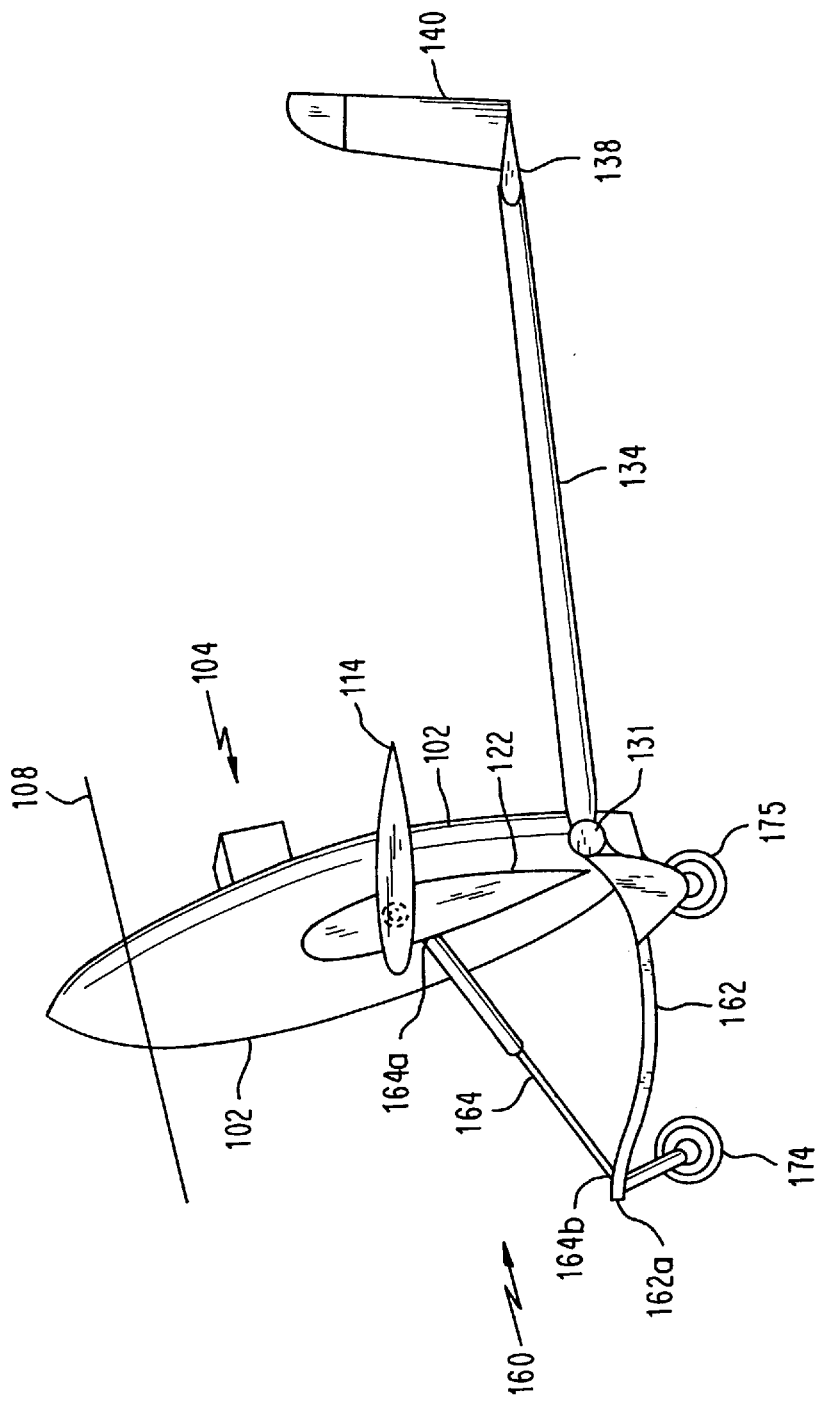

STOL/VTOL FREE WING AIRCRAFT WITH IMPROVED SHOCK DAMPENING AND ABSORBING MEANS

RELATED APPLICATIONS

The present application is a continuation-in-part of prior application Ser. No. 08/332,321, filed Oct. 31, 1994, which is a continuation of prior application Ser. No. 08/007,130, filed Jan. 22, 1993, entitled "STOL/VTOL Free Wing Aircraft With Articulated Tail Boom," now U.S. Pat. No. 5,395,073, which is a continuation-in-part of prior application Ser. No. 07/850,913, filed Mar. 13, 1992, entitled "Thrust Vectoring Free Wing Aircraft," now U.S. Pat. No. 5,340,057, which is a continuation-in-part of prior application Ser. No. 07/795,329, filed Nov. 21, 1991, entitled "Lockable Free Wing Aircraft," now U.S. Pat. No. 5,280,863, the disclosures of which are incorporated by reference herein in their entirety.

TECHNICAL FIELD

The present invention relates generally to short field and vertical take-off and landing (STOL/VTOL) aircraft and, more particularly, to a STOL/VTOL aircraft including thrust vectoring means located either inside or outside of the propeller wash, the thrust vectoring means permitting transitioning between STOL or VTOL and straight and level flight.

BACKGROUND ART

The above-referenced patent applications disclose aircraft utilizing a free wing configuration. As used in this present specification, a free wing or "freewing" is a wing attached to an aircraft fuselage in a manner such that the wing is freely pivotable about its spanwise axis. This arrangement enables the wing to have an angle of attack which is determined solely by aerodynamic forces acting on the wing. Rotation of the wing, without pilot intervention, induced by changes in the direction of relative wind over the wing surfaces, causes the angle of incidence between the wing and the aircraft fuselage to vary so that the wing presents a substantially constant angle of attack to the relative wind which, in horizontal flight, enables the aircraft to be essentially stall free.

The free wing is free to rotate or pivot about its spanwise axis, preferably located forward of its aerodynamic center. The free wing generally includes left and right wings extending from opposite sides of the fuselage; these wings are coupled together to collectively freely pivot about the spanwise axis. The left and right wings may be adjustable in pitch relative to one another as disclosed in the aforesaid applications, the relevant disclosures of which are incorporated by reference herein. The aircraft may further include rudders and elevators in a tail section or the aft end of the fuselage which may be controlled in a conventional manner for yaw and pitch control, respectively. Further, it will be appreciated that other types of propulsion systems may be utilized, such as counter-rotating propellers, variable pitch propulsion systems, as disclosed in co-pending application serial no. To Be Assigned, entitled "STOL/VTOL Free Wing Aircraft with Variable Pitch Propulsion Means", filed concurrently herewith, and multi-engine arrangements attached to the fuselage.

One of the major advantages of a free wing aircraft is that the aircraft is intrinsically stable; thus, the aircraft is particularly suitable for use as an unmanned aerial vehicle (UAV) where a highly stable platform is necessary and desirable. For example, UAV's are often used by the military as platforms for maintaining sensors trained on a target. Fixed wing UAV aircraft have a high sensitivity to turbulence, particularly at low altitudes; thus a stabilization system is required for onboard sensors to counter turbulence-induced platform motion. The high stability of a free wing aircraft eliminates or minimizes the stabilization problem in a UAV aircraft because the platform itself, i.e., the fuselage, is much more turbulent even in low-altitude, highly turbulent conditions.

The above-referenced U.S. Pat. Nos. 5,340,057 and 5,395,073, incorporated herein in their entirety by reference, disclose different embodiments of a thrust vectoring VTOL/STOL aircraft having a free wing. The first-mentioned patent, '057, discloses a VTOL aircraft generally including a fuselage, a free wing, a propulsion system, and aerodynamic surfaces carried by the fuselage for vectoring the thrust of the propulsion system away from the predetermined direction of flight sufficiently to achieve near vertical flight orientation to establish an angle between the fuselage and the direction of flight. That is, the fuselage is "tilted" relative to the direction of flight. When the fuselage is so tilted, the direction of thrust becomes vectored, that is, the direction is neither vertical nor horizontal, but includes components in both directions. In the embodiment of the '057 patent, the thrust vectoring means is located entirely within the propeller wash. In a second embodiment disclosed in the '073 patent, the thrust vectoring means is not entirely within the propeller wash. Specifically, this embodiment includes a tail section having a horizontal surface which protrudes from the tail section to such an extent that it is not affected by, i.e., is outside of, the propeller wash. Keeping the thrust vectoring means entirely within the propeller wash enables the aircraft to achieve full hover capability.

The operation of both embodiments is similar. Upon take-off, the fuselage of the aircraft is oriented either vertical, in a VTOL aircraft, or near vertical, in a STOL aircraft, so that the thrust vector is entirely or primarily vertical. To transition from vertical to horizontal flight, the pitch of the fuselage is caused to move toward a horizontal orientation. By pitching the fuselage, the thrust vector also inclines from the vertical and thus has a horizontal thrust component. As the fuselage pitches toward the horizontal, the horizontal speed of the aircraft increases, causing the freely rotatable wing to rotate relative to the fuselage in accordance with the relative wind. The effects of the relative wind acting on the freely rotating wings quickly overcome the effects of the airflow over the wings from the propulsion system and, with increasing horizontal speed, the wing develops lift. The aircraft soon transitions into horizontal flight in a free wing flight mode.

To transition from horizontal to vertical flight, the reverse procedure is employed. An "up" elevator command is given to rotate the fuselage toward a vertical orientation with its nose pointed upwardly. Horizontal speed is thus decreased and a vertical thrust vector is introduced. Accordingly, the relative wind changes and the free wing and fuselage ultimately both rotate into a vertical or near vertical orientation.

Unique to the first embodiment is the requirement for launch and landing assists. For instance, the aircraft of the first embodiment must be mounted for launch in a vertical orientation on a launch system. Such a launch system may comprise, for example, suitable guides disposed on the fuselage of the aircraft which engage a launch rail such that the aircraft and rail are directed generally vertically. With the engine started and propeller backwash providing an air flow over the wings, the aircraft lifts off of the launch rail. Catapult assists may be provided. On landing, the aircraft is placed in the vertical orientation and positioned a short distance above a recovery net. When the engine is turned off, the aircraft drops gently into the net.

The second embodiment of the aircraft, the STOL embodiment, permits a very steep descent. In fact, descent angles of 45° or more are not uncommon, particularly for UAV's. While conventional landing gear wheels include some capacity for shock absorption, they cannot damp the landing loads generated at such a steep descent. Hence, when the aircraft descends faster and/or steeper than ideal, the shock loads generated as the aircraft touches the runway cause the aircraft to rebound and bounce off the runway.

Furthermore, one of the most important advantages of a free wing aircraft is the ability to handle turbulence with minimal tossing of the aircraft. Thus, even sensitive equipment can be mounted to the aircraft with relatively simple mounting systems, thereby dispensing with complicated and expensive gimbaling stabilizers used in conventional aircraft. Without an effective shock absorbing and damping systems for landing, however, this advantage is severely compromised.

Thus, it is an object of this invention to provide an improved free wing aircraft which can accommodate extreme shock loads on landing.

Another object of this invention is to provide an improved free wing aircraft having an effective system for absorbing shock loads generated during landing.

Yet another object of this invention is to provide an improved free wing aircraft having an effective system for damping shock loads generated during landing.

SUMMARY OF THE INVENTION

These objects are achieved by the shock damping and absorbing means of the present invention.

A thrust vectoring free wing aircraft, according to the present invention, comprises a fuselage including a source of propulsion for propelling the aircraft in a horizontal flight and in a short field take-off and landing (STOL) flight mode. A free wing is connected to the fuselage for free pivotal movement relative thereto about a spanwise axis. A tail boom is connected to the fuselage. The tail boom is formed with horizontal tail surfaces and vertical tail surfaces to provide for directional stability and yaw control. A mechanism is provided for pivoting the fuselage relative to the tail boom independently from pivoting of the free wing about the spanwise axis, about an axis of pivot extending parallel to or coincident with the spanwise axis. Also provided is means for damping shock landing loads.

The tail boom includes a cross tube extending transversely through the fuselage and a pair of resilient tail boom members respectively attached to opposite ends of the cross tube to project rearwardly therefrom. The horizontal and vertical tail surfaces are formed at distal ends of the tail boom members. Portions of the tail boom members extend forwardly from the tail boom cross tube to form a landing gear strut. The damping means comprises the tail boom member landing gear struts.

In accordance with another embodiment of this invention, the tail boom member landing gear struts form a leaf spring.

The aircraft further comprises two pairs of landing wheels respectively mounted to the struts in tandem spaced relationship.

The aircraft may further comprise means for absorbing shock loads upon landing.

The shock loads absorbing means preferably comprises at least one dashpot operatively secured to the fuselage and the forward end of at least one of the pair of struts for absorbing the shock loads upon landing.

In accordance with a further aspect of this invention, the fuselage includes a pair of fixed wing center portions on either side thereof. A pair of dashpots are provided, each secured to one of the pair of fixed wing center portions and one of the landing gear struts.

In accordance with another aspect of this invention, the shock loads absorbing means comprises a pair of struts mounted to the opposite sides of the aft end of the fuselage and at least one dashpot operatively secured to the fuselage and the forward end of at least one of the pair of struts for absorbing the shock loads upon landing.

In accordance with a further embodiment of this invention, an aircraft comprises a fuselage including a source of propulsion for propelling the aircraft in a horizontal flight and in a short field take-off and landing (STOL) flight mode. A free wing is connected to the fuselage for free pivotal movement relative thereto about a spanwise axis. A tail boom is connected to the fuselage. The tail boom is formed with horizontal tail surfaces and vertical tail surfaces to provide for directional stability and yaw control. A mechanism is provided for pivoting the fuselage relative to the tail boom independently from pivoting of the free wing about the spanwise axis, about an axis of pivot extending parallel to or coincident with the spanwise axis. Also provided is means for absorbing shock loads upon landing.

In accordance with a further aspect of this invention, the tail boom includes a cross tube extending transversely through the fuselage and a pair of tail boom members respectively attached to opposite ends of the cross tube to project rearwardly therefrom. The horizontal and vertical tail surfaces are formed at distal ends of the tail boom members. Portions of the tail boom members extend forwardly from the tail boom cross tube to form landing gear struts. The shock loads absorbing means comprises at least one dashpot operatively secured to the fuselage and the forward end of at least one of the pair of struts for absorbing the shock loads upon landing.

According to a further embodiment of this invention, an aircraft comprises a fuselage and a wing connected to the fuselage for free pivotal movement about a spanwise axis for flight in a predetermined generally horizontal direction in a free wing mode of aircraft operation. A variable pitch propulsion system is carried by the fuselage for developing thrust and propelling the aircraft both in the predetermined direction and in either a near vertical flight orientation or a short field take-off and landing flight mode, the variable pitch propulsion system permitting increased glide path control during landing. Aerodynamic surfaces are carried by the fuselage for vectoring the thrust of the propulsion system away from the predetermined direction of flight sufficiently to achieve either the near vertical flight orientation or the STOL flight mode. Thus, an angle is established between the fuselage and the direction of flight. Also provided is means for damping shock landing loads.

According to yet another embodiment of this invention, an aircraft comprises a fuselage and a wing connected to the fuselage for free pivotal movement about a spanwise axis for flight in a predetermined generally horizontal direction in a free wing mode of aircraft operation. A variable pitch propulsion system is carried by the fuselage for developing thrust and propelling the aircraft both in the predetermined direction and in either a near vertical flight orientation or a short field take-off and landing flight mode, the variable pitch propulsion system permitting increased glide path control during landing. Aerodynamic surfaces are carried by the fuselage for vectoring the thrust of the propulsion system away from the predetermined direction of flight sufficiently to achieve either the near vertical flight orientation or the STOL flight mode, thereby establishing an angle between the fuselage and the direction of flight. Also provided is means for absorbing shock loads upon landing.

BRIEF DESCRIPTION OF THE DRAWINGS

FIG. 3 is a side view of the aircraft of FIGS. 1 and 2, wherein the fuselage is in the tilted up or STOL orientation.

DETAILED DESCRIPTION OF THE PREFERRED EMBODIMENTS

Figure 1:
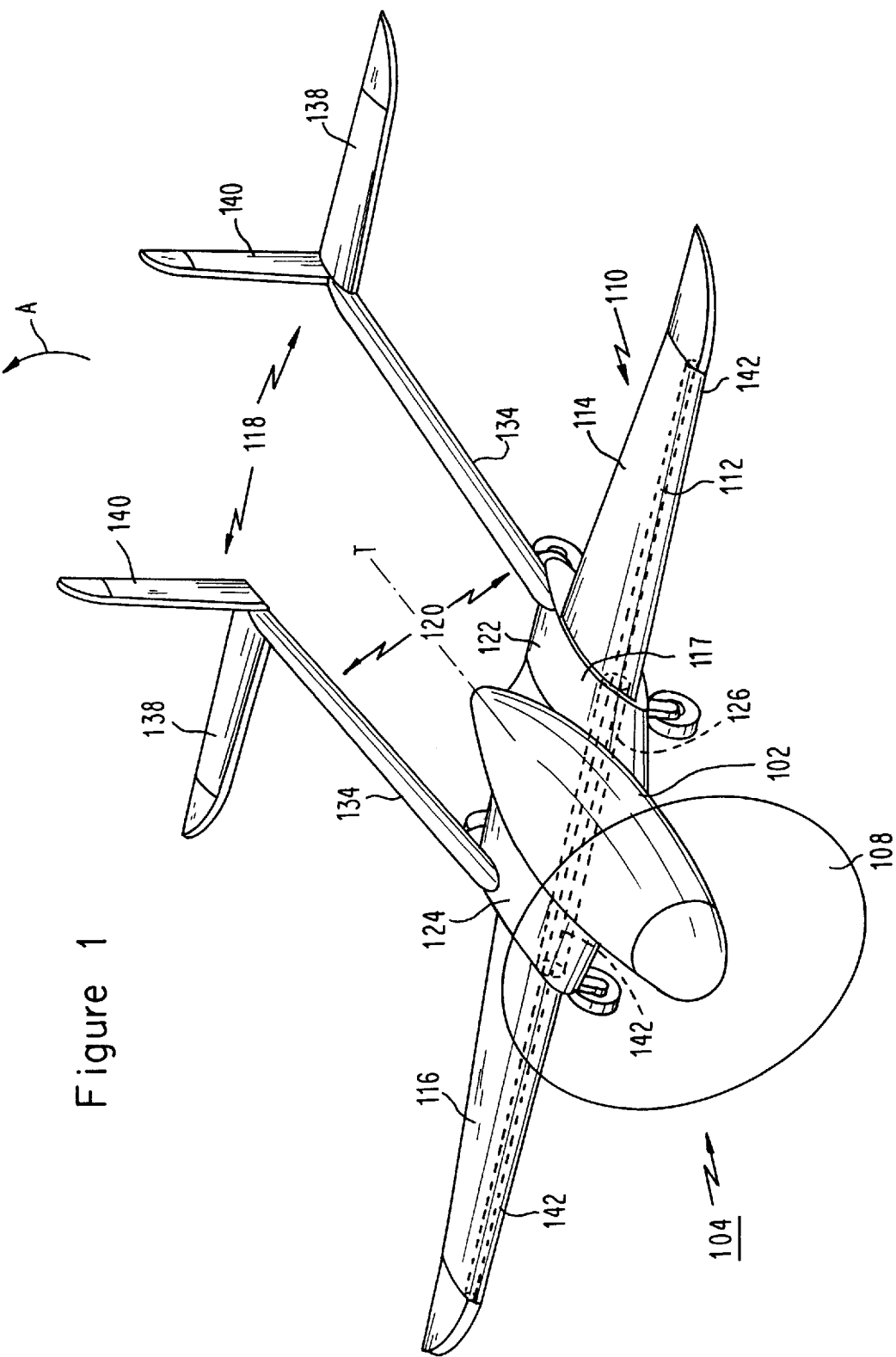
FIG. 1 is a perspective view of an embodiment of the STOL free wing aircraft of the present invention, depicted in the straight and level flight mode.
Figure 2:
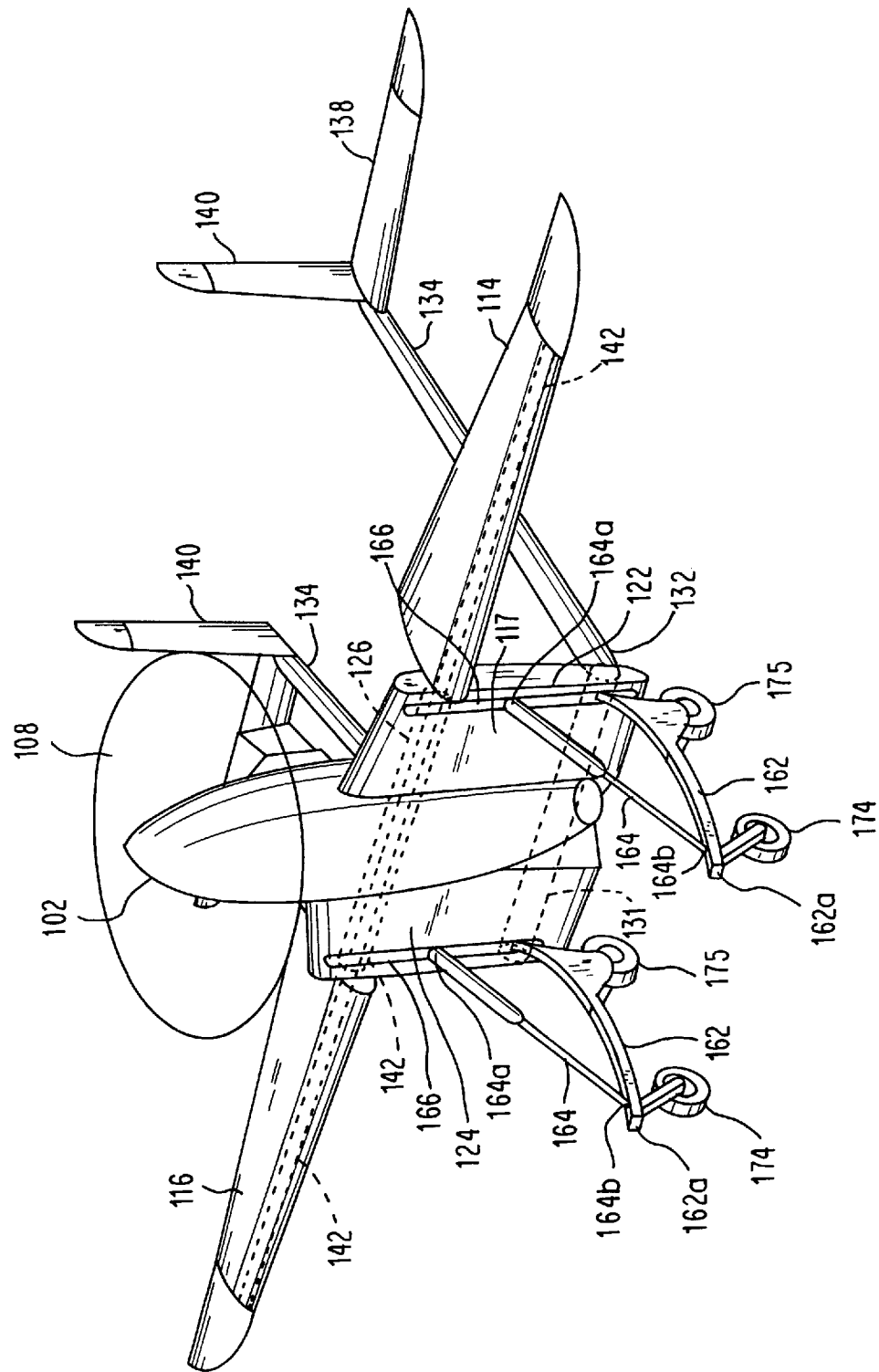
FIG. 2 is a perspective view of the aircraft of FIG. 1, wherein the fuselage is in the tilted up or STOL orientation.

As illustrated in FIGS. 1–3, a free wing aircraft 100, as disclosed in co-pending application Ser. No. 08/332,321 and the '073 patent, incorporated herein by reference, is capable of short field take-offs and landings (STOL) and straight and level flight, and, with some minor modifications, vertical take-offs and landings (VTOL) as well. Free wing aircraft 100 comprises a fuselage 102 containing a propulsion system 104 including, for instance, an engine (not shown) at the forward end of the fuselage rotating a propeller 108. While a single propeller propulsion system is shown, it is to be understood that the present invention encompasses other types of propulsion systems, including but not limited to jet propulsion systems and variable pitch propulsion systems. A number of advantages are associated with the use of a variable pitch propulsion system, as discussed in co-pending application serial no. To Be Assigned, entitled "STOL/ VTOL Free Wing Aircraft with Variable Pitch Propulsion Means", filed concurrently herewith. For example, a variable pitch propulsion system permits much greater glide path control of the aircraft during landing, because the variable pitch propulsion system permits virtually instantaneous adjustment of the aircraft lift and/or speed during descent. Other aspects of the variable pitch propeller system are disclosed in the aforementioned application, incorporated herein by reference.

Free wing 110 is connected to fuselage 102 and is free to rotate or pivot about its spanwise axis 112 located forward of its aerodynamic center. Free wing 110 includes left and right wings 114 and 116 extending from a fixed wing root or center section 117 formed on opposite sides of fuselage 102 and which left and right wings are coupled to collectively freely pivot about spanwise axis 112. Left and right wings 114, 116 may be adjustable in pitch relative to one another in the manner described in the aforesaid '057 patent, or may be formed with elevons (not shown) to provide for elevator and aileron control. Aircraft 100 further comprises a tail section 118 which is mounted to a boom assembly 120 pivotally connected or articulated to fuselage 102 for movement relative to the fuselage both into and out of alignment with the thrust line T of propulsion system 104 to enable STOL/VTOL operations as well as straight and level flight. Preferably, boom assembly 120 includes a pair of parallel booms 134, each including at the rear end thereof a horizontal stabilizing member 138 and a vertical stabilizing member 140.

More specifically, fixed wing center section 117 of fuselage 102 comprises left and right hand fixed wing root portions 122 and 124 which are rigidly and non-rotatably attached to the fuselage sides for rotation with the fuselage relative to spanwise axis 112. This spanwise axis 112 is defined by an outer tube 126 which extends transversely through fuselage 102 and fixed wing center sections 122, 124 in a direction perpendicular to the aircraft longitudinal axis.

Free wing 116 is connected to fuselage 102 through a connecting tube 142 which defines spanwise axis 112, extends coaxially through outer tube 126, and projects outwardly from fixed wing center sections 122, 124 into left and right free wings 114, 116. Connecting tube 142 is thus rotatable on tube 126 about spanwise axis 112. Therefore, it can be seen that left and right wings 114, 116 are coupled together through, and supported by, inner tube 142 extending within outer tube 126 through fixed wing center sections 122, 124 to collectively freely pivot about spanwise axis 112 independent of the attitude of fuselage 102 and fixed wing sections. Alternatively, single tube 142 may be substituted with left and right tubes (not shown), in which case a mechanism may be provided for adjusting the pitch of left and right wings 114, 116 relative to one another, such as the mechanism depicted in FIG. 4 of the '057 patent, incorporated by reference herein in its entirety.

In the preferred embodiment disclosed herein, a second cross tube 131 is provided in the rear portion of fuselage 102 and fixed wing center sections 122, 124 for connection to forward ends 132 of parallel booms 134 of boom assembly 120 projecting rearwardly therefrom. This connection may be rigid, for instance, a welded attachment, or, alternatively, may be a quick-release type connection, as disclosed in co-pending application serial no. To Be Assigned, entitled "STOL/VTOL Free Wing Aircraft with Modular Wing and Tail," filed concurrently herewith, the disclosure of which is incorporated herein by reference. Second cross tube 131 defines the forwardmost end of tail boom assembly 120 as well as the pivot axis therefor.

An exemplary mechanism for pivoting articulated tail boom assembly 120 about second cross tube 131 relative to fuselage 102 is shown and disclosed in FIG. 10 of the '073 reference, incorporated herein by reference. The mechanism preferably generally includes a gear train transferring the rotary motion of a motor to rotation of cross tube 131. The gear train may include, for instance, a pair of worm gears, each having an axis of rotation disposed at 90° from one another, or a bevel gearing arrangement, or a rack and pinion arrangement, wherein the pinion gear is mounted to the boom cross tube and the rack is mounted within the fuselage for longitudinal translation to rotate the pinion and thereby the boom assembly. Yet another alternative includes a threaded screw rod/collar arrangement as described in the aforesaid '073 patent.

The feature of swinging or pivoting the entire boom assembly 120 and tail section 118 out of straight and level alignment with fuselage 102 and thrust line T of propulsion system 104 thereon advantageously results in an aircraft 100 capable of taking off and landing in slow flight or STOL mode while retaining the advantages of free wing flight as well as the following additional advantage. By locating tail and rudder surfaces 138, 140 at the distal end of the boom 120, these tail surfaces are, in effect, cantilevered from the combined center of gravity of the fuselage and wing. As a result, directional stability and yaw control is improved, even at very slow horizontal or forward speeds.

Since tail surfaces 138, 140 are not subject to any dynamic pressure effects caused by the slip stream of propeller 108 when in the STOL flight mode of FIGS. 2 and 3, it will be appreciated that directional stability and yaw control deteriorates at extremely slow or 0 horizontal speeds as will occur during VTOL flight as opposed to STOL flight. Fixed wing center section 117 advantageously remains in the slip stream and the dynamic pressure acting thereon tends to provide some degree of directional stability and yaw control.

Fixed wing root or center section 117, in horizontal flight mode depicted in FIG. 1, performs as a wing by generating lift in association with left and right free wing sections 114, 116. When tail boom 120 is "raised," fixed wing center section 117 advantageously acts as an aerodynamic brake (see, e.g., the FIG. 2 position) to rapidly decelerate aircraft 100 to slow flight.

Referring to FIGS. 2 and 3, a landing gear arrangement 160 is shown in the operative configuration. Each tail boom 134 includes a landing gear strut 162 rigidly extending forwardly from tail boom cross tube 131. Swivelably mounted in a conventional manner to the forward end of each landing gear strut 162 is a front landing gear wheel 174. Preferably, front landing gear wheel 174 is a caster wheel. A rear landing gear wheel 175 is rigidly secured in a conventional manner to the rear end of each landing gear strut 162 in tandem with front landing gear wheel 174. Each landing gear strut 162 is preferably made of a resilient material, such as a carbon composite material, so that the landing gear strut 162 provides damping of landing shock loads. It thus can be appreciated by one skilled in the art that landing gear strut 162 acts as a leaf spring to dampen these shock loads.

As best seen in FIG. 2, each fixed wing root portion 122, 124 includes on the underside thereof a generally elongated recess 166 adapted to receive landing gear strut 162 therein when articulated boom 134 is disposed parallel relative to fuselage 102, i.e., when in the straight and level flight mode of FIG. 1.

Extending between fixed wing Section 117 of fuselage 102 and a forward portion 162a of landing gear strut 162 is a dashpot 164. A dashpot is a conventional shock absorber used to dampen and control a spring movement, wherein the energy of a mass in motion is converted to heat by forcing a fluid through a restriction, and the heat is dissipated from the shock absorber. Preferably, a pair of dashpots 164 is provided, each secured to one of fixed wing root portions 122, 124.

Specifically, dashpot 164 is pivotally secured at an upper end 164a thereof in recess 166. At a lower end 164b thereof, dashpot 164 is pivotally secured to a forward end 162a of landing gear strut 162. Upon actuation of boom 134, as described herein, dashpot 164 is extended as shown in FIGS. 2 and 3 to provide shock absorption as described above. One of ordinary skill in the art will appreciate that the provision of dashpots located between the fixed wing root portions and the landing gear struts results in absorption of the shock loads generated by aircraft 100 upon landing.

The operation of the invention will now be described. On landing, aircraft 100 experiences various shock loads. As the aircraft touches the ground, the shock loads are damped because of the resiliency of landing gear strut 162. Additionally, larger shock loads, which in the prior art aircraft would have caused the aircraft to jump off the runway in reaction to the loads, are instead absorbed by the dashpot as described herein.

It can be appreciated that no actuation of landing gear arrangement 160 is required. In the horizontal flight mode, shown in FIG. 1, landing gear struts 162 are received in recess 166 of center root portions 117, with only the landing gear wheels protruding minimally into the airstream. Dashpots 164, in a retracted configuration, are also received within recess 166. Tilting of fuselage 102 relative to tail boom 120 results in the actuation of landing gear struts 162 for landing, and the resulting extension of dashpots 164, as best seen in FIGS. 2 and 3.

It is further to be appreciated that the provision of a dashpot is merely a preferred embodiment, and that any suitable shock absorber may be used, provided, however, that the shock absorber is capable of absorbing landing loads and shielding the fuselage from these loads.

Thus, in accordance with the invention disclosed herein, the shock loads generated by landing are both damped by landing gear strut 162 and absorbed by dashpot 164 advantageously disposed between the landing gear strut and fuselage 102. As a result, the fuselage of the aircraft is shielded from the landing loads, thereby protecting the equipment and passengers on board the aircraft from experiencing these loads. Additionally, the damping and absorbing of the shock loads prevents the aircraft from jumping off the runway in reaction to the shock loads.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. An aircraft, comprising:

a. a fuselage including a source of propulsion for propelling the aircraft in a horizontal flight and in a short field take-off and landing (STOL) flight mode;

b. a freewing connected to the fuselage for free pivotal movement relative thereto about a spanwise axis;

c. a tail boom connected to the fuselage, the tail boom being formed with tail surfaces to provide for directional stability and yaw control;

d. a mechanism pivoting the fuselage relative to the tail boom independently from pivoting of the freewing about the spanwise axis, about an axis of pivot extending parallel to or coincident with the spanwise axis; and e. means including a forwardly extending resilient portion of the tail boom for damping shock landing loads having wheels at the front of said extending portion, wherein the tail boom includes a cross tube extending transversely through the fuselage and a pair of resilient tail boom members respectively attached to opposite ends of the cross tube to project rearwardly therefrom, the tail surfaces being formed at distal ends of the tail boom members, wherein portions of the tail boom members extend forwardly from the tail boom cross tube to form landing gear struts, the damping means comprising the tail boom member landing gear struts, wherein the landing gear struts form a leaf spring.

* * * * *